US010387288B2

United States Patent
Pistoia et al.

(10) Patent No.: US 10,387,288 B2
(45) Date of Patent: *Aug. 20, 2019

(54) INTERACTIVE ANALYSIS OF A SECURITY SPECIFICATION

(71) Applicant: International Business Machines Corporation, Armonk, NY (US)

(72) Inventors: Marco Pistoia, Hawthorne, NY (US); Takaaki Tateishi, Yamamoto (JP); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 461 days.

This patent is subject to a terminal disclaimer.

(21) Appl. No.: 14/468,820

(22) Filed: Aug. 26, 2014

(65) Prior Publication Data
US 2014/0366146 A1 Dec. 11, 2014

Related U.S. Application Data

(63) Continuation of application No. 13/448,029, filed on Apr. 16, 2012, now Pat. No. 8,875,297, and a
(Continued)

(51) Int. Cl.
*G06F 11/00* (2006.01)
*G06F 12/14* (2006.01)
(Continued)

(52) U.S. Cl.
CPC ........... *G06F 11/3604* (2013.01); *G06F 8/43* (2013.01); *G06F 9/44589* (2013.01);
(Continued)

(58) Field of Classification Search
CPC ............. G06F 11/3604; G06F 11/3672; G06F 11/3684; G06F 11/3688; G06F 21/52;
(Continued)

(56) References Cited

U.S. PATENT DOCUMENTS

| 6,002,869 | A | 12/1999 | Hinckley |
| 7,159,198 | B1 * | 1/2007 | Ip ............ G06F 17/504 |
| | | | 716/106 |

(Continued)

FOREIGN PATENT DOCUMENTS

JP 2009155705 6/2009

OTHER PUBLICATIONS

Dirk Beyer, Adam J. Chlipala, Thomas A. Henzinger, Ranjit Jhala, and Rupak Majumdar. 2004. Generating Tests from Counterexamples. In Proceedings of the 26th International Conference on Software Engineering (ICSE '04). IEEE Computer Society, Washington, DC, USA, 326-335.*

(Continued)

*Primary Examiner* — Lynn D Feild
*Assistant Examiner* — Vadim Savenkov
(74) *Attorney, Agent, or Firm* — Cuenot, Forsythe & Kim, LLC

(57) ABSTRACT

Analyzing a security specification. An embodiment can include identifying a downgrader in a computer program under test. Testing on the downgrader can be performed in a first level of analysis. Responsive to the downgrader not passing the testing performed in the first level of analysis, a counter example for the downgrader can be automatically synthesized. Further, a test unit can be created for the downgrader using the counter example as an input parameter to the downgrader. The test unit can be executed to perform testing on the downgrader in a second level of analysis. Responsive to the downgrader passing the testing performed in the second level of analysis, a user can be prompted to simplify a model of the downgrader.

10 Claims, 3 Drawing Sheets

Related U.S. Application Data continuation of application No. 13/313,757, filed on Dec. 7, 2011, now Pat. No. 8,863,292.

(51) Int. Cl.

| | |
|---|---|
| G06F 12/16 | (2006.01) |
| G08B 23/00 | (2006.01) |
| G06F 11/36 | (2006.01) |
| G06F 21/52 | (2013.01) |
| G06F 8/41 | (2018.01) |
| G06F 9/445 | (2018.01) |
| G06F 21/56 | (2013.01) |
| G06F 21/57 | (2013.01) |

(52) U.S. Cl.
CPC ...... *G06F 11/3672* (2013.01); *G06F 11/3684* (2013.01); *G06F 11/3688* (2013.01); *G06F 21/52* (2013.01); *G06F 21/562* (2013.01); *G06F 21/577* (2013.01)

(58) Field of Classification Search
CPC ........ G06F 21/562; G06F 21/577; G06F 8/43; G06F 9/44589
See application file for complete search history.

(56) References Cited

U.S. PATENT DOCUMENTS

| | | | |
|---|---|---|---|
| 7,283,945 B2 | 10/2007 | Rajan | |
| 7,506,288 B1* | 3/2009 | Ip | G06F 17/504 716/106 |
| 7,895,552 B1* | 2/2011 | Singhal | G06F 17/504 716/106 |
| 8,103,914 B2 | 1/2012 | Kikuchi | |
| 8,381,199 B2 | 2/2013 | Tateishi et al. | |
| 8,572,747 B2 | 10/2013 | Berg et al. | |
| 8,863,292 B2 | 10/2014 | Pistoia et al. | |
| 8,875,297 B2 | 10/2014 | Pistoia et al. | |
| 2002/0046393 A1* | 4/2002 | Leino | G06F 9/44589 717/146 |
| 2002/0062476 A1* | 5/2002 | Saxe | G06F 8/433 717/126 |
| 2002/0112201 A1* | 8/2002 | Flanagan | G06F 11/3608 714/42 |
| 2005/0160321 A1* | 7/2005 | Cleaveland | G06F 11/3684 714/38.1 |
| 2006/0010428 A1* | 1/2006 | Rushby | G06F 11/3684 717/124 |
| 2007/0074188 A1* | 3/2007 | Huang | G06F 21/54 717/141 |
| 2009/0089618 A1* | 4/2009 | Rajan | G06F 11/3684 714/33 |
| 2009/0292941 A1* | 11/2009 | Ganai | G06F 11/3636 714/2 |
| 2010/0058475 A1 | 3/2010 | Thummalapenta et al. | |
| 2010/0333061 A1 | 12/2010 | Mohalik et al. | |
| 2010/0333201 A1 | 12/2010 | Haviv et al. | |
| 2011/0231828 A1 | 9/2011 | Kaulgud et al. | |
| 2012/0017200 A1 | 1/2012 | Ghosh et al. | |
| 2012/0084754 A1 | 4/2012 | Ziegler et al. | |
| 2012/0096440 A1 | 4/2012 | Tateishi et al. | |
| 2012/0131668 A1 | 5/2012 | Berg et al. | |
| 2012/0151592 A1 | 6/2012 | Veanes et al. | |
| 2012/0233599 A1 | 9/2012 | Basauri et al. | |
| 2013/0152204 A1 | 6/2013 | Pistoia et al. | |
| 2013/0152205 A1 | 6/2013 | Pistoia et al. | |

OTHER PUBLICATIONS https://www.merriam-webster.com/dictionary/prompt.*
Moller, A. et al., "The pointer assertion logic engine," in PLDI '01, Procs. of ACM SIGPLAN 2001 Conf. on Programming Language Design and Implementation, 2001, 11 pgs.
Christensen, A.S. et al., "Precise analysis of string expressions," in SAS '03 Proc. of 10th Int'l Conf. on Static Analysis, 2003, pp. 1-18.
Wassermann, G. et al., "Sound and precise analysis of web applications for injection vulnerabilities," in PLDI '07, Proc. of o2007 ACM SIGPLAN Conf. on Programming Language Design and Implementation, vol. 42, No. 6, Jun. 2007, pp. 32-41.
Engelfriet, J. et al., "MSO definable string transductions and two-way finite state transducers," Journal of ACM Transactions on Computational Logic (TOCL), vol. 2, No. 2, Apr. 2001, pp. 216-254.
Minamide, Y, "Static approximation of dynamically generated web pages," WWW '05 Proc. of 14th Int'l Conf. on World Wide Web, 2005, pp. 432-441.
Klarlund, N. et al., "MONA version 1.4 user manual," Basic Research in Computer Science, Univesrity of Aarhus, Jan. 2001, 71 pgs.
Yu, F. et al., "String analysis," [Online] 2008, retrieved from the Internet: <http://citeseerx.ist.psu.edu/viewdoc/summary?doi=10.1.1.84.3591>, 15 pgs.
Rosen, B.K. et al., "Global value numbers and redundant computations," in POPL '88 Proc. of 15th ACM SIGNPLAN-SIGACT Symposium on Principles of Programming Languages, 1988, pp. 12-27.
Cytron, R. et al., "Efficiently computing static single assignment form and the control dependence graph," ACM Trans. on Programming Languages and Systems (TOPLAS), vol. 13, No. 4, Oct. 1991, pp. 451-490.
Henriksen, J.G. et al., "MONA: Monadic second-order logic in practice," in TACAS '95 Proc. of 1st Int'l. Workshop on Tools and Algorithms for Construction and Analysis of Systems, 1995, pp. 89-110.
Geay, E. et al., "Modular string-sensitive permission analysis with demand-driven precision," ICSE '09 Proc. of 31st In'l Conf. on Software Engineering, 2009, pp. 177-187.
Topnik et al., "jMosel: A flexible tool-set for monadic second-order logic on strings," 13th SPIN Workshop on Model Checking Software, Mar. 30-Apr. 1, 2006, 11 pgs.
Andraus, Z.S., et al., "Reveal: A Formal Verification Tool for Verilog Designs," LPAR 2008 Proceedings of the 15th Int'l. Conf. on Logic for Programming, Artificial Intelligence, and Reasoning, pp. 343-352, 2008.
Tateishi, T., et al., "Path- and Index-sensitive String Analysis Based on Monadic Second-order Logic," in Proceedings of the 2011 International Symposium on Software Testing and Analysis, ISSTA '11, 2011, 11 pgs.
Kong, D., et al., "ISA: A Source Code Static Vulnerability Detection System Based on Data Fusion," InfoScale '07 Proceedings of the 2nd international conference on Scalable information systems, 14 pgs., 2007.
Unno, H. et al., "Combining Type-Based Analysis and Model Checking for Finding Counter-Examples Against non-Interference," Proc.of 2006 Workshop on Programming Languages and Analysis for Security, ACM, pp. 17-26, Jun. 2006.
Henzinger, T.A. et al., "Lazy Abstraction," ACM SIGPLAN Notices vol. 37, No. 1, pp. 58-70, 2002.
Balzarotti, D. et al., "SANER: Composing Static and Dynamic Analysis to Validate Sanitization in Web Applications," IEEE Symposium on Security and Privacy (SP 2008), pp. 387-401, 2008.
Hooimeijer, P. et al., "Fast and Precise Sanitizer Analysis with BEK," in Proc. of 20th USENIX Conf. on Security, pp. 1-1. USENIX Association, 2011.
Chang, R. et al., "Inputs of COMA: Static Detection of Denial-Of-Service Vulnerabilities," in 22nd IEEE Computer Security Foundations Symposium (CSF'09), pp. 186-199. IEEE, 2009.
Yu, F. et al., "Symbolic String Verification: An Automata-Based Approach," in Model Checking Software, pp. 306-324, Springer Berlin Heidelberg, 2008.
"Code Refactoring," [online] from Wikipedia, the free encyclopedia, Sep. 19, 2013, retrieved from the Internet: <http://en.wikipedia.org/wiki/Code_refactoring>, 6 pg.
"Synthesis/Synthesize," [online] Meriam-Webster, Inc. © 2014, retrieved from the Internet: <http://www.meriam-webster.com/dictionary/synthesis/synthesizing>, 5 pg.

(56) References Cited

OTHER PUBLICATIONS

"Complement," [online] Dictionary.com [retrieved Sep. 30, 2013] retrieved from the Internet: <http://www.dictionary.reference.com/browse/coplement?s-t>, 3 pg.

Ball, T., "Formalizing Counterexample-Driven Refinement With Weakest Preconditions," in Engineering Theories of Software Intensive Systems, pp. 121-139. Springer Netherlands, 2005.

U.S. Appl. No. 13/313,757, Non-Final Office Action, dated Mar. 4, 2013, 26 Pg.

U.S. Appl. No. 13/313,757, Non-Final Office Action, dated Oct. 8, 2013, 30 Pg.

U.S. Appl. No. 13/313,757, Final Office Action, dated Mar. 26, 2014, 33 Pg.

U.S. Appl. No. 13/313,757, Notice of Allowance, dated Jun. 9, 2014, 8 Pg.

U.S. Appl. No. 13/448,029, Non-Final Office Action, dated Mar. 4, 2013, 26 Pg.

U.S. Appl. No. 13/448,029, Non-Final Office Action, dated Oct. 1, 2013, 30 Pg.

U.S. Appl. No. 13/448,029, Final Office Action, dated Mar. 26, 2014, 32 Pg.

U.S. Appl. No. 13/448,029, Notice of Allowance, dated Jun. 24, 2014, 11 Pg.

U.S. Appl. No. 13/448,029, Corrected Notice of Allowability, dated Aug. 6, 2014, 6 Pg.

\* cited by examiner

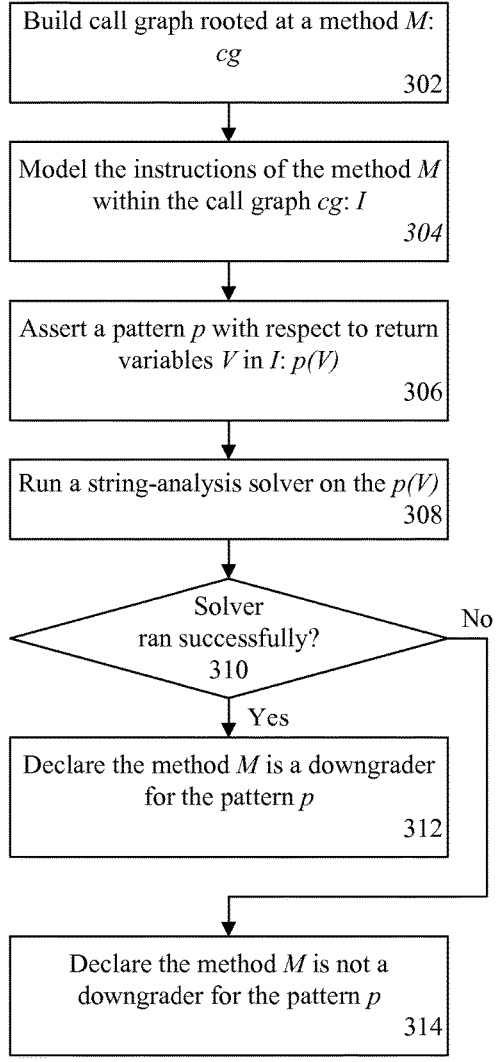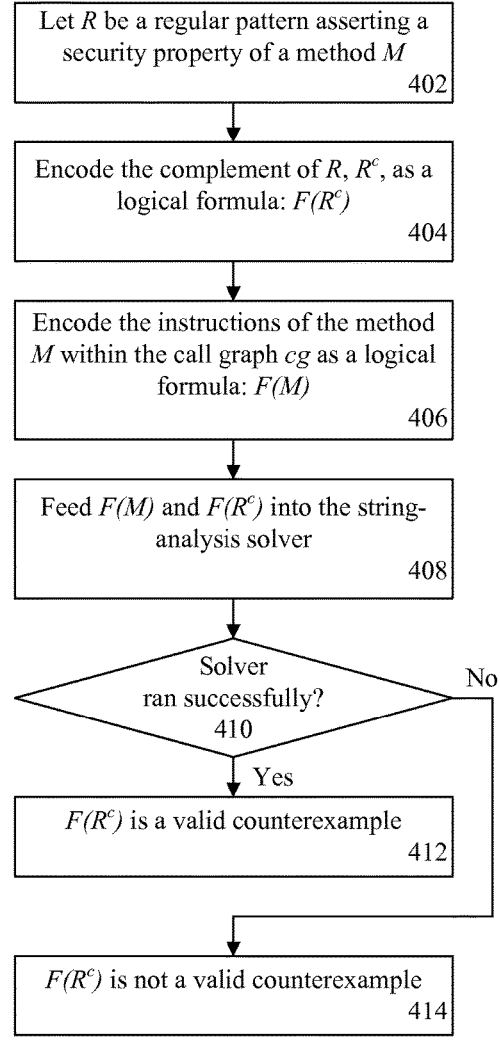
FIG. 3
FIG. 4

INTERACTIVE ANALYSIS OF A SECURITY SPECIFICATION

CROSS-REFERENCE TO RELATED APPLICATIONS

This application is a Continuation of U.S. application Ser. No. 13/448,029, Apr. 16, 2012, which is a Continuation of U.S. application Ser. No. 13/313,757, filed on Dec. 7, 2011, the entirety of both which are incorporated herein by reference.

BACKGROUND

One or more embodiments disclosed within this specification relate to security analysis of computer programs.

Static program analysis enables complex properties of a program to be provided via over-approximation of the program's runtime behavior, which reduces the state space required for a proof. A real-world example of static program analysis in the field of security analysis is downgrader detection. A downgrader can be implemented as a sanitizer and/or as a validator used in security analysis. A sanitizer performs transformation on program code, while a validator typically merely performs validation.

When security analysis is performed, information flows sometimes are seeded by statements in the program that read as user inputs, which are known as sources. These statements are tracked. If there is a path from a source to a security-sensitive operation, known as a sink, which does not go through either sanitization or validation by a downgrader, then a vulnerability is reported.

BRIEF SUMMARY

One or more embodiments disclosed within this specification relate to analyzing a security specification.

An embodiment can include identifying a downgrader in a computer program under test. Testing on the downgrader can be performed in a first level of analysis. Responsive to the downgrader not passing the testing performed in the first level of analysis, a counter example for the downgrader can be automatically synthesized. Further, a test unit can be created for the downgrader using the counter example as an input parameter to the downgrader. The test unit can be executed to perform testing on the downgrader in a second level of analysis. Responsive to the downgrader passing the testing performed in the second level of analysis, a user can be prompted to simplify a model of the downgrader.

Another embodiment can include identifying a downgrader in a computer program under test. Testing on the downgrader can be performed in a first level of analysis. Responsive to the downgrader not passing the testing performed in the first level of analysis, a counter example for the downgrader can be automatically synthesized. Further, a test unit can be created for the downgrader using the counter example as an input parameter to the downgrader. The test unit can be executed to perform testing on the downgrader in a second level of analysis. Responsive to the downgrader not passing the testing performed in the second level of analysis, the user to can be prompted to indicate whether an actual problem exists with the downgrader.

Another embodiment can include a system that includes a processor configured to initiate executable operations and/or functions disclosed within this specification.

Another embodiment can include a computer program product for analyzing a security specification. The computer program product can include a computer-readable storage medium having computer-readable program code embodied therewith, the computer-readable program code configured to perform the various operations and/or functions disclosed within this specification.

BRIEF DESCRIPTION OF THE SEVERAL VIEWS OF THE DRAWINGS

FIG. 3 is a flow chart illustrating a method of analyzing a downgrader in accordance with an embodiment of the present invention.

FIG. 4 is a flow chart illustrating a method of synthesizing a counter example in accordance with an embodiment of the present invention.

DETAILED DESCRIPTION

Figure 1:
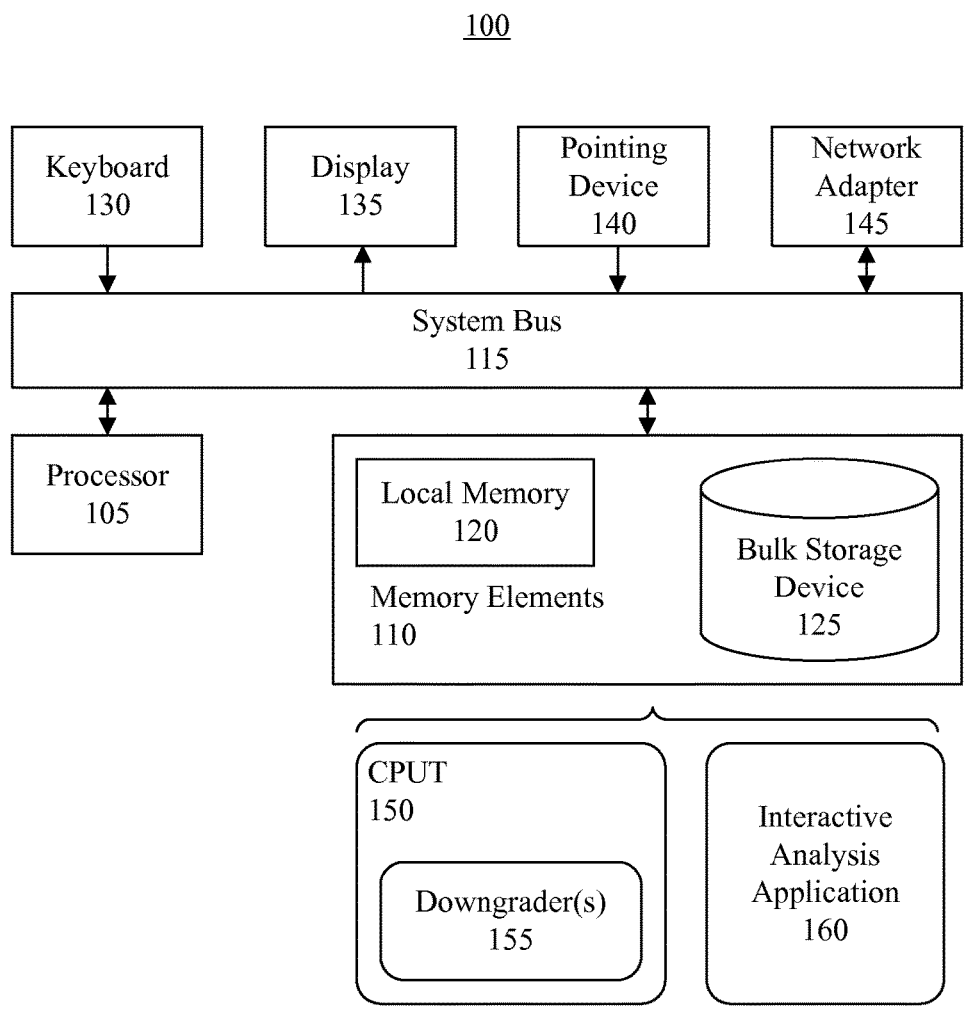
FIG. 1 is a block diagram illustrating a system for interactively analyzing a security specification in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagram of methods, apparatus (systems), and computer program products according to embodiments of the invention. It will be understood that each block of the flowchart illustrations and/or block diagram, and combinations of blocks in the flowchart illustrations and/or block diagram, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Several definitions that apply throughout this document will now be presented. As used herein, the term "user" means a human being (e.g., a software engineer, computer engineer, or web developer). As used herein, the term "downgrader" means one or more program code modules that perform validation and/or transformation of user inputs in a computer program. As used herein, the term "counter example" means a concrete string outside of a set of strings used to verify whether a method or function is a downgrader candidate. As used herein, the term "test unit" means a downgrader that is provided as an input a counter example.

In accordance with the embodiments disclosed herein, a downgrader can be interactively analyzed to determine whether the downgrader is properly designed to satisfy the downgrader's intended use. If a downgrader does not pass testing performed in a first level of analysis, a counter example can be synthesized, and a unit test can be created using the synthesized counter example as an input parameter to the downgrader. A user then can execute the test unit using the counter example as an input parameter to perform testing in a second level of analysis.

If the test unit passes testing performed in the second level of analysis, this may indicate to the user that the downgrader is overly complex for the purpose of the first level of analysis. Accordingly, the user can be prompted to simplify the downgrader model and the testing in the first level of analysis can again be performed on the simplified downgrader model. If the test unit does not pass the testing performed in the second level of analysis, such failure may indicate that a problem exists in the downgrader. The results of the second level of analysis can be provided to the user, and the user can indicate whether a problem does indeed exist in the downgrader. If the user indicates that a problem exists, the downgrader can be identified as being unsafe. If not, the user can be prompted to refine an input specification for the downgrader, and the first level of analysis can be performed on the refined downgrader model.

FIG. 1 is a block diagram illustrating a system 100 for interactively analyzing a security specification in accordance with one embodiment of the present invention. The system 100 can include at least one processor 105 coupled to memory elements 110 through a system bus 115. As such, the system 100 can store program code within the memory elements 110. The processor 105 can execute the program code accessed from memory elements 110 via a system bus 115. In one aspect, for example, the system 100 can be implemented as computer that is suitable for storing and/or executing program code. It should be appreciated, however, that the system 100 can be implemented in the form of any system comprising a processor and memory that is capable of performing the functions described within this specification.

The memory elements 110 can include one or more physical memory devices such as, for example, local memory 120 and one or more bulk storage devices 125. Local memory 120 refers to random access memory or other non-persistent memory device(s) generally used during actual execution of the program code. The bulk storage device(s) 125 can be implemented as a hard drive or other persistent data storage device. The system 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135 and a pointing device 140 optionally can be coupled to the system 100. The I/O devices can be coupled to the system 100 either directly or through intervening I/O controllers. One or more network adapters 145 also can be coupled to the system 100 to enable the system 100 to become coupled to other systems, computer systems, remote printers, and/or remote storage devices through intervening private or public networks. Modems, cable modems, and Ethernet cards are examples of different types of network adapters that can be used with the system 100.

As pictured in FIG. 1, the memory elements 110 can store a computer program under test (CPUT) 150. The CPUT 150 can include one or more downgraders 155. The downgraders 155 can be implemented as a methods within or accessed by the CPUT 150, or within suitable program modules within or accessed by the CPUT 150. The CPUT 150 can be any computer program that receives and processes user inputs. In one non-limiting example, the CPUT 150 can be a web-based application accessible to users via one or more communication networks, such as the Internet or an intranet. The invention is not limited in this regard, however, and the CPUT 150 can be implemented as any other computer program that uses one or more downgraders 155 to validate and/or transform user inputs.

The memory elements 110 also can store an interactive analysis application 160. The interactive analysis application 160, being implemented in the form of executable program code, can be executed by the system 100 to perform interactive analysis of the CPUT 150 to analyze one or more of the downgraders 155, as will be described herein. In this regard, the interactive analysis application 160 can present messages, prompts, and other relevant information to a user via the display 135 indicative of the results obtained by analyzing the downgraders 155, and prompt the user to perform various tasks related to the downgraders 155.

Figure 2:
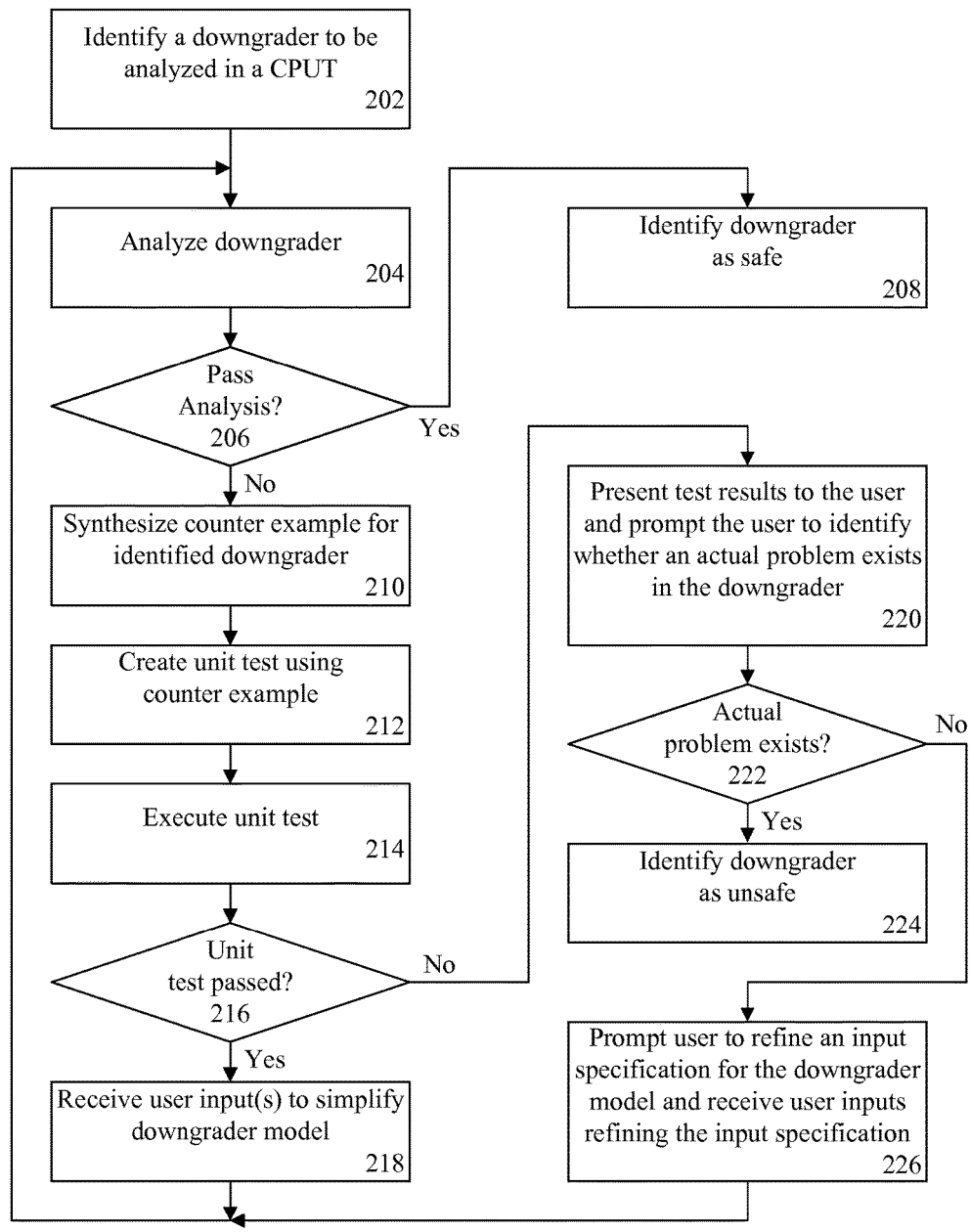
FIG. 2 is a flow chart illustrating a method of interactively analyzing a security specification in accordance with another embodiment of the present invention.

FIG. 2 is a flow chart illustrating a method 200 of interactively defining a security specification in accordance with another embodiment of the present invention. At step 202, a downgrader in a CPUT can be identified. In one embodiment, the downgrader can be identified by a user selection of the downgrader. In another embodiment, the downgrader can be automatically identified. In illustration, a processor, such as the processor 105 (FIG. 1), can execute the interactive analysis application to search the program code of the CPUT in order to identify downgraders used by the CPUT, and identify the type of malicious attack the downgraders are intended to secure against. For example, the processor can search for known code segments relating to a particular type of attack, such as a cross-site scripting (XSS) attack, or initiate a simulated attack by simulating malicious user inputs and track the portions of the program code that process the simulated malicious inputs.

At step 204, a first level of analysis can be performed on the selected downgrader to determine whether the downgrader is considered safe. An example of implementation of the first level of analysis is described in the method 300 of FIG. 3. Continuing with the method 200, a downgrader can be considered safe if the downgrader properly passes the first level analysis by validating and/or transforming user inputs to prevent a malicious attack which the downgrader is intended to protect against.

In one embodiment, to perform the first level of analysis, the processor can employ string analysis to seed statements into the CPUT that are interpreted (e.g., read) by the CPUT as user inputs. Such user inputs can be referred to as sources. The seeding of the statements into the CPUT can initiate an information flow, and this information flow can be tracked by the processor. If there is a path from the source to a security-sensitive operation, known as a sink, which does not go through validation and/or transformation by the selected downgrader, then a vulnerability can be reported, indicating that the downgrader potentially is unsafe. The statements seeded into the CPUT can be string values generated by the string analysis, for example using suitable algorithms that generate string values. Each string value can approximate a string value that potentially may be entered to the CPUT via a client, for example by client side user or malicious client side application.

In one embodiment, the statements seeded into the CPUT can be used to simultaneously perform steps 202, 204. In other words, the program flow initiated by the seeded statements can be tracked both to identify a downgrader that processes the seeded statements and to determine whether the downgrader properly validates and/or transforms the seeded statements as may be necessary to prevent a malicious attack.

Referring to decision box 206, if the identified downgrader passes testing performed in the first level analysis performed at step 204, at step 208 the identified downgrader can be identified as being safe. If, however, the identified downgrader does not pass the testing in the first level of analysis, the process can proceed to step 210.

At step 210, the interactive analysis application can synthesize a counter example for the identified downgrader. An example of counter example syntheses is described in the method 400 of FIG. 4. Continuing with the method 200, at step 212, a unit test can be created using the counter example. In illustration, the counter example can be configured to replicate a user input to the downgrader, and the unit test can be provided to an instance of the downgrader that processes as a user input the counter example.

At step 214, the unit test can be executed to perform testing on the downgrader in a second level of analysis using the counter example as an input to the downgrader. For example, a user can be informed that the unit test has been created, and provided an option to execute the unit test. The execution of the unit test can be analyzed to determine whether execution of the unit test using the counter example identifies a real problem in the downgrader.

Referring to decision box 216, if the unit test passes the second level of analysis, the user can be prompted to simplify the downgrader model. At step 218, user inputs can be received to simplify the downgrader model. For example, if the downgrader includes the following line of code:

str=complexRemove ('x', 'y', 'z'); and the "complexRemove" function is a complex operation that cannot be modeled sufficiently accurately by a static analysis, the user can summarize the function by performing the following mapping:

.*−>.*\{'x', 'y', 'z'}This mapping can take place between regular expressions abstracting the strings at the entry and exit of the transition, respectively. The process then can return to step 204 and testing in the first level of analysis again can be performed using the simplified downgrader model. The first level of analysis can prove the correctness of the simplified downgrader model, or return to the user an improved counter example.

Referring again to decision box 216, if the test unit does not pass the testing performed in the second level of analysis performed at step 214, at step 220 the results of the testing can be presented to the user and the user can be prompted to identify whether an actual problem exists in the downgrader model. In illustration, although the test unit does not pass the testing performed in the second level of analysis, such testing may be conservative and identify an issue as being a potential problem, but this issue may turn out not to actually be a problem. The user can evaluate the test results and make the determination whether the issue actually is a problem or not. At decision box 222, if the user indicates that an actual problem does indeed exist with the downgrader model, at step 224 the downgrader can be identified as being unsafe. The user then can be provided an opportunity to revise the downgrader model. If the user so chooses, after the downgrader model is revised, the user can repeat the process to analyze the revised downgrader.

If the user indicates that an actual problem does not exist, at step 226 the user can be prompted to refine an input specification for the downgrader model, and user inputs to refine the input specification can be received from the user. The process then can return to 204 and testing in the first level of analysis again can be performed using the simplified downgrader model. The first level of analysis can prove the correctness of the simplified downgrader model, or return to the user an improved counter example.

FIG. 3 is a flow chart illustrating a method 300 of analyzing a downgrader in accordance with an embodiment of the present invention. The method 300 can be implemented at step 204 of the method 200 of FIG. 2.

At step 302, a call graph cg can be rooted at a method (or function) M. At step 304, the instructions of the method M can be modeled within the call graph cg to generate a model for the string analysis (e.g., as a formula in monadic second-order logic). At step 306, a pattern p can be asserted in the call graph I with respect to return variables V (i.e., p(V)). At step 308, a string-analysis solver can be applied to the model to check whether p(V) is true. One example of a suitable string-analysis solver is MONA, but the invention is not limited in this regard.

Referring to decision box 310, if the string-analysis solver runs successfully on p(V) (e.g., the string-analysis solver returns the value "true" for p(V)), at step 312 the method M can be declared a downgrader for the pattern p. In this regard, the downgrader can be considered to have passed the first level of analysis at step 206 of FIG. 2. If the string-analysis solver does not run successfully, the method M can be declared as not being a downgrader for the pattern p. In this regard, the downgrader can be considered to not have passed the first level of analysis at step 206 of FIG. 2.

FIG. 4 is a flow chart illustrating a method 400 of synthesizing a counter example in accordance with an embodiment of the present invention. The method 400 can be implemented at step 210 of the method 200 of FIG. 2 to synthesize a counter example for the identified downgrader.

At step 402, let R be a regular pattern asserting a security property of a method M. At step 404, a complement of R, $R^c$, can be encoded as a logical formula $F(R^c)$. For example, if the regular pattern R is in the form of "^(*script.*)" (i.e., all words not containing substring "script"), the complement $R^c$ may take the form of "x_script_y".

At step 406, the instructions of the method M can be encoded within the call graph cg as a logical formula F(M). At step 408, logical formulas F(M) and $F(R^c)$ can be fed into the string-analysis solver. Referring to decision box 410, if the string-analysis solver runs successfully, at step 412 $F(R^c)$ can be identified as being a valid counter example. If the string-analysis solver does not run successfully, at step 414 $F(R^c)$ can be identified as not being a valid counter example. In this case, a prompt can be presented to the user indicating that a valid counter example was not generated, and the method 200 of FIG. 2 need not proceed to step 212.

In one embodiment, the interactive analysis application can be implemented as IBM® Rational® AppScan® Source Edition (IBM, Rational and AppScan are trademarks of International Business Machines Corporation in the United States, other countries, or both).

Like numbers have been used to refer to the same items throughout this specification. The flowcharts and block diagram in the Figures illustrate the architecture, functionality, and operation of possible implementations of systems, methods and computer program products according to various embodiments of the present invention. In this regard, each block in the flowcharts or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustrations, and combinations of blocks in the block diagram and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of analyzing a security specification, the method comprising:
identifying a downgrader in a computer program under test;
via a processor, performing testing on the downgrader in a first level of analysis;
if the downgrader does not pass the testing performed in the first level of analysis:
automatically synthesizing a counter example for the downgrader;
creating a test unit for the downgrader using the counter example as an input parameter to the downgrader; and
executing the test unit to perform testing on the downgrader in a second level of analysis;
if the downgrader does not pass the testing performed in the second level of analysis, prompting the user to indicate whether an actual problem exists with the downgrader; and
if the user indicates that the actual problem does not exist with the downgrader, presenting to the user a prompt that prompts the user to refine an input specification for the model of the downgrader.

2. The method of claim 1, wherein executing the test unit to perform testing on the downgrader in the second level of analysis comprises:
receiving from the user a user input to initiate execution of the test unit.

3. The method of claim 1, wherein performing testing on the downgrader in the first level of analysis comprises:
building a call graph rooted at a method corresponding to the downgrader;
modeling instructions of the method within the call graph;
asserting a pattern with respect to return variables in the call graph having the modeled instructions; and
running a string-analysis solver on asserted pattern.

4. A method of analyzing a security specification, the method comprising:
identifying a downgrader in a computer program under test;
via a processor, performing testing on the downgrader in a first level of analysis;
if the downgrader does not pass the testing performed in the first level of analysis:
automatically synthesizing a counter example for the downgrader;
creating a test unit for the downgrader using the counter example as an input parameter to the downgrader;
executing the test unit to perform testing on the downgrader in a second level of analysis; and
if the downgrader does not pass the testing performed in the second level of analysis, prompting a user to indicate whether an actual problem exists with the downgrader; and
if the user indicates that the actual problem does not exist with the downgrader, presenting to the user a prompt that prompts the user to refine an input specification for the model of the downgrader.

5. A system comprising:
a hardware processor configured to initiate executable operations comprising:
identifying a downgrader in a computer program under test;
performing testing on the downgrader in a first level of analysis;
if the downgrader does not pass the testing performed in the first level of analysis:
automatically synthesizing a counter example for the downgrader;
creating a test unit for the downgrader using the counter example as an input parameter to the downgrader; and
executing the test unit to perform testing on the downgrader in a second level of analysis;
if the downgrader does not pass the testing performed in the second level of analysis, prompting the user to indicate whether an actual problem exists with the downgrader; and
if the user indicates that the actual problem does not exist with the downgrader, presenting to the user a prompt that prompts the user to refine an input specification for the model of the downgrader.

6. The system of claim 5, wherein executing the test unit to perform testing on the downgrader in the second level of analysis comprises:
receiving from the user a user input to initiate execution of the test unit.

7. The system of claim 5, wherein performing testing on the downgrader in the first level of analysis comprises:
building a call graph rooted at a method corresponding to the downgrader;
modeling instructions of the method within the call graph;
asserting a pattern with respect to return variables in the call graph having the modeled instructions; and
running a string-analysis solver on asserted pattern.

8. A computer program product for analyzing a security specification, the computer program product comprising:
a computer-readable storage device, wherein the computer-readable storage device is not a transitory, propagating signal per se, the computer-readable storage device having computer-readable program code embodied therewith, the computer-readable program code comprising:
computer-readable program code configured to identify a downgrader in a computer program under test;
computer-readable program code configured to perform testing on the downgrader in a first level of analysis;
computer-readable program code configured to, if the downgrader does not pass the testing performed in the first level of analysis:
automatically synthesize a counter example for the downgrader;
create a test unit for the downgrader using the counter example as an input parameter to the downgrader; and
execute the test unit to perform testing on the downgrader in a second level of analysis;
computer-readable program code configured to, if the downgrader does not pass the testing performed in the second level of analysis, prompt the user to indicate whether an actual problem exists with the downgrade; and
computer-readable program code configured to, if the user indicates that the actual problem does not exist with the downgrader, present to the user a prompt that prompts the user to refine an input specification for the model of the downgrader.

9. The computer program product of claim 8, wherein the computer-readable program code configured to execute the test unit to perform testing on the downgrader in the second level of analysis comprises:
computer-readable program code configured to receive from the user a user input to initiate execution of the test unit.

10. The computer program product of claim 8, wherein the computer-readable program code configured to perform testing on the downgrader in the first level of analysis comprises:
computer-readable program code configured to build a call graph rooted at a method corresponding to the downgrader;
computer-readable program code configured to model instructions of the method within the call graph;
computer-readable program code configured to assert a pattern with respect to return variables in the call graph having the modeled instructions; and
computer-readable program code configured to run a string-analysis solver on asserted pattern.

* * * * *